United States Patent [19]
Garza et al.

[11] Patent Number: 5,910,884
[45] Date of Patent: Jun. 8, 1999

[54] HEATSINK RETENTION AND AIR DUCT ASSEMBLY

[75] Inventors: Jose Arturo Garza, Austin; Dales Morrison Kent; Ciro Neal Ramirez, both of Round Rock; Rajeev Ranjan Sinha, Austin, all of Tex.

[73] Assignee: International Business Machines Corporation, Armonk, N.Y.

[21] Appl. No.: 09/146,658

[22] Filed: Sep. 3, 1998

[51] Int. Cl.[6] ...................................................... H05K 7/20
[52] U.S. Cl. ..................... 361/690; 361/692; 361/702; 361/704; 361/719; 361/720; 257/718; 257/719; 257/722; 165/80.3; 174/16.1; 174/16.3
[58] Field of Search ..................... 361/690, 692, 361/704, 707, 702, 714, 715, 719, 720, 718; 257/706, 707, 717–719, 721, 722, 727; 165/80.3, 185; 174/16.1, 16.3

[56] References Cited

U.S. PATENT DOCUMENTS

| | | | |
|---|---|---|---|
| 4,115,836 | 9/1978 | Hutchison et al. | 361/702 |
| 4,945,448 | 7/1990 | Bremenour et al. | 361/690 |
| 5,243,218 | 9/1993 | Zenitani et al. | 257/718 |
| 5,247,425 | 9/1993 | Takahasi | 361/717 |
| 5,305,185 | 4/1994 | Samarov et al. | 361/704 |
| 5,424,913 | 6/1995 | Swindler | 361/687 |
| 5,526,229 | 6/1996 | Wakabayashi et al. | 361/702 |
| 5,812,375 | 9/1998 | Casperson | 361/707 |

*Primary Examiner*—Leo P. Picard
*Assistant Examiner*—Boris L. Chervinsky
*Attorney, Agent, or Firm*—Joseph Lally; Leslie Van Leeuwen

[57] ABSTRACT

An air duct structure for use in cooling a circuit card comprised of a printed circuit board to which an integrated circuit is connected. The air duct structure includes an air duct cover and a spring. The air duct cover includes a major panel that is sized or dimensioned to substantially cover the circuit card. First and second side panels extending substantially perpendicularly from opposing ends of the major panel to form a bracket. A depth of the bracket is suitable for receiving the circuit card and a heatsink positioned in close contact with the integrated circuit. When the circuit card and the heatsink are suitably received within the air duct cover, the air duct cover and the printed circuit board define an air duct within which the heatsink resides. The spring is attached to an interior surface of the major panel. The spring is positioned on the major panel to contact the heatsink and retain the heatsink in the close contact with the integrated circuit when the heatsink and the circuit card are suitably received by the air duct cover.

19 Claims, 5 Drawing Sheets

HEATSINK RETENTION AND AIR DUCT ASSEMBLY

BACKGROUND

1. Field of the Present Invention

The present invention generally relates to dissipating heat generated by an integrated circuit, and more specifically to an assembly for retaining a heatsink in contact with an integrated circuit and introducing an air duct around the heatsink.

2. History of Related Art

Market demands for processing intensive applications such as multimedia have resulted in an ever increasing demand for computing systems that operate at higher speeds. In addition, market preferences generally dictate that smaller packages are preferred to larger packages. Unfortunately for manufacturers and suppliers of such computing systems, thermal considerations generally dictate a preference for slower operating speeds and larger packages. To achieve market place success therefore, manufacturers must design increasingly efficient mechanisms and systems for dissipating heat within an electronic component such as a computer without significantly increasing cost, complexity, or package size In the recent past, typically only the central processor of a computing system generated enough heat to warrant extensive heat dissipation consideration. More recently however, the higher operating speeds demanded of components peripheral to the central processor have resulted in the need to expand the number of components requiring heat dissipation mechanisms. For example, many computing systems include one or more peripheral interfaces that comply with various industry standard bus architectures such as the Industry Standard Architecture (ISA), Extended Industry Standard Architecture (EISA), or Peripheral Component Interface (PCI). These standards may require bus frequencies in excess of 100 MHz thereby creating significant thermal energy. In addition, the application hardware that is being developed for these architectures is becoming increasingly complex. Because the physical dimensions of expansion cards designed for such industry standard interfaces is constrained, however, designers of such cards must attempt to utilize every available square inch of the board if they are to fully implement today's advanced designs on a single expansion card.

Typically, heatsinks are used to assist in the thermal control of high speed, high power integrated circuits. At a time when heatsinks were most commonly mounted only to a central processing units that were located on a relatively large mother board, designers could afford to be less concerned about the amount of space required for the hardware necessary to secure the heatsink to the integrated circuit. If, for example, a heatsink required four screws, the holes necessary to receive these securing screws, and the amount of board space consumed by these holes did not pose a tremendous problem for the designer. As the number of heatsinks on an individual board has increased and the amount of board space available has decreased, the conventional methods of securing heatsinks to their associated devices has become increasingly problematic. In addition, it is not uncommon to further secure the contact between the heatsink and the integrated circuit with some form of thermally conductive paste or adhesive. As the complexity and cost of fabricating integrated circuits has increased and the market lifetime of products has decreased because of the accelerating rate at which advances are achieved, it has become increasingly important to be able to easily perform replacement and rework functions on circuit cards. Unfortunately, the prior methods of securing heatsinks to their associated integrated circuits using extensive hardware and adhesive made rework a difficult task. Therefore it would be desirable to implement a heat dissipation system that facilitated this important function.

In addition to the problems noted above, a common method of increasing the thermal dissipation capability of a system in the past has been to increase the size of the heatsinks themselves. As stated above, however, the demands for smaller packages and less costly devices run generally contrary to a philosophy of increasing the size of the heatsink with each succeeding generation of integrated circuits or surrounding the heatsinks with expensive hardware designed to either cool the ambient temperature or implement an alternative cooling medium such as liquid cooling systems. Therefore it is desirable to implement a heat dissipation system that provided a means for increasing the cooling capacity of a given heatsink without significantly increasing the cost or complexity of the resulting system.

SUMMARY OF THE INVENTION

The problems identified above are in large part addressed by a heatsink retention and air duct assembly according to the present invention. By introducing an assembly that permits the elimination of a great deal of the attachment hardware required of predecessor heat dissipation systems and the facilitation of increased air flow across the heatsink, the present invention provides a mechanism by which manufacturers can address thermal considerations associated with modern systems without significantly increasing the cost, size, or complexity of such systems.

Broadly speaking, the present invention contemplates an air duct structure for use in cooling a circuit card comprised of a printed circuit board to which an integrated circuit is connected. The air duct structure includes an air duct cover and a spring. The air duct cover includes a major panel that is sized or dimensioned to substantially cover the circuit card. First and second side panels extend substantially perpendicularly from opposing ends of the major panel to form a bracket. A depth of the bracket is suitable for receiving the circuit card and a heatsink positioned in close contact with the integrated circuit. When the circuit card and the heatsink are suitably received within the air duct cover, the air duct cover and the printed circuit board define an air duct within which the heatsink resides. The spring is attached to an interior surface of the major panel. The spring is positioned on the major panel to contact the heatsink and retain the heatsink in the close contact with the integrated circuit when the heatsink and the circuit card are suitably received by the air duct cover.

In a presently preferred embodiment, the air duct cover is comprised of a thermally conductive material such as aluminum and includes a plurality of exhaust holes concentrated at a chassis end of the air duct cover. In one embodiment, the first side panel includes a recess suitable for permitting contact fingers of the circuit card to extend exterior to the air duct when the circuit card is received within the air duct cover. Preferably, the air duct cover includes a fastener hole suitable for receiving a fastener that is aligned with respect to a fastener hole in the circuit card such that the circuit card fastener hole and the air duct cover fastener hole are in alignment when the circuit card is appropriately received by the air duct cover. In the preferred embodiment, the spring comprises stainless steel and includes a fixed end attached to the major panel and an elevated end, wherein the elevated end is displaced from the major panel when the fixed end is attached to the major panel. In one embodiment, the air duct structure further includes a template that is attached to the major panel of the air duct cover using spacer structures such that the template is parallel to and displaced between the major panel and the printed circuit board. The template includes an aperture that is sized and positioned to receive the heatsink when the heatsink is in the close contact with the integrated circuit to prevent lateral motion of the heatsink with respect to the integrated circuit. Utilizing the heat dissipation assembly of the present invention eliminates the need for including fastening holes for each heatsink associated with a particular circuit card.

The present invention further contemplates a computer assembly comprising a chassis, a mother board, a bus board, and an expansion card. The mother board is situated within the chassis and includes a processor. The bus board is received within a bus connector of the mother board. The bus board includes at least one expansion card connector suitable for receiving an expansion card. The expansion card includes a printed circuit board, a heatsink, an air duct cover, and a spring. An integrated circuit is connected to the printed circuit board, which is received within the expansion card connector. The heatsink is positioned in close contact with the integrated circuit. The air duct cover is attached to the printed circuit board such that the air duct cover and the printed circuit board cooperatively define an air duct in which the heatsink resides. The spring is affixed to an interior surface of the air duct cover and positioned wherein the spring contacts the heatsink and retains the heatsink in the close contact with the integrated circuit. In the preferred embodiment, the computer assembly includes a template attached between the air duct cover and the printed circuit board. The aperture of the template circumscribes the heatsink and prevents the heatsink from lateral movement with respect to the integrated circuit. In one embodiment, the processor comprises an x86 compatible processor and the bus connector, the bus board, and the expansion card comply with the PCI standard. In a preferred embodiment, the air duct cover includes a plurality of exhaust holes concentrated at a chassis end of the air duct cover, where the chassis end of the air duct cover is proximal to the chassis of the computer assembly and the direction of air flow through the air duct is towards the chassis end of the air duct cover.

BRIEF DESCRIPTION OF THE DRAWINGS

Other objects and advantages of the invention will become apparent upon reading the following detailed description and upon reference to the accompanying drawings in which.

Figure 1:
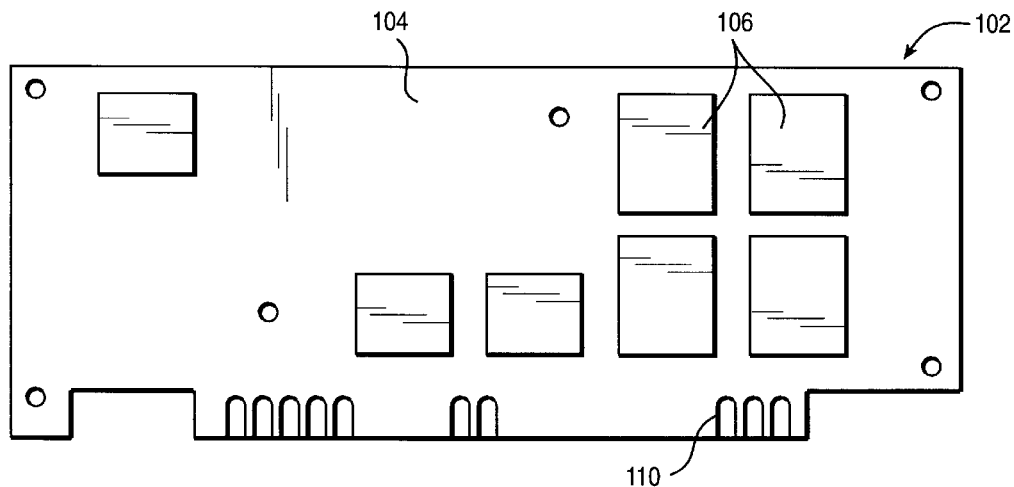
FIG. 1 is a top plan view of a circuit card including an integrated circuit connected to a printed circuit board.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Figure 7:
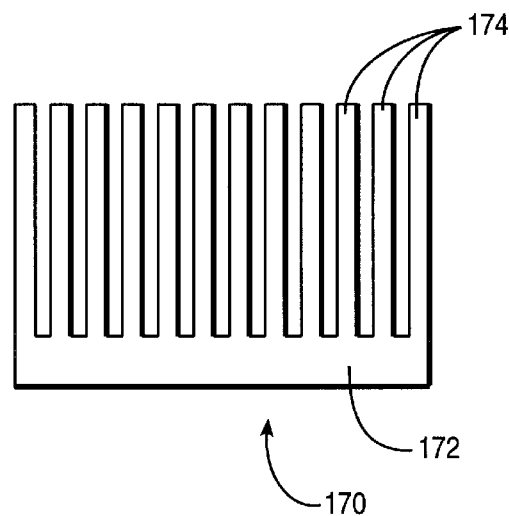
FIG. 7 is a plan view of a heatsink.

Turning now to the drawings, FIG. 1 depicts a circuit card 102 as is well known in the field of electronics. Circuit card 102 includes a printed circuit board 104 typically comprised of an electrically non-conductive epoxy material onto which one or more levels of conductive interconnect patterns are fabricated. Circuit card 102 further includes at least one and typically numerous integrated circuits 106 which are connected to printed circuit board 104. Each integrated circuit 106 includes a plurality of selectively interconnected electronic components such as transistors, resistors, diodes, and capacitors fabricated on a monolithic semiconductor material such as silicon and fabricated according to well known semiconductor fabrication and packaging techniques. In the embodiment shown in FIG. 1, circuit card 102 includes connection fingers 110 designed for easy insertion into a suitable connector. When in operation, each integrated circuit 106 of circuit card 102 generates thermal energy that slows device operation and, if left unchecked, can ultimately cause permanent damage to integrated circuit 106 causing integrated circuit 106 to produce undesirable results or resulting in an entirely non-functional system. Typically, heat is dissipated away from the largest heat producing integrated circuits 106 through the use of heatsinks. Turning briefly to FIG. 7, a typically heatsink 170 is shown including a plurality of fin structures 174 extending away from a base portion 172. Heatsink 170 is comprised of a thermally conductive material such as aluminum or other suitable material. (For purposes of this disclosure, a thermally conductive material is defined as a material possessing a thermal conductivity in excess of approximately 10 J/s-m-C°.) Base portion 172 is typically positioned in close contact with an upper surface of integrated circuit 106 and may include a highly thermally conductive film (not shown in FIG. 7) for increasing the thermal dissipation capacity of the contact between heatsink 170 and integrated circuit 106. The physical structure of heatsink 170 results in efficient dissipation of thermal energy due to the high thermal conductivity of the heatsink material and the large surface area created by the plurality of fins 174.

Figure 3:
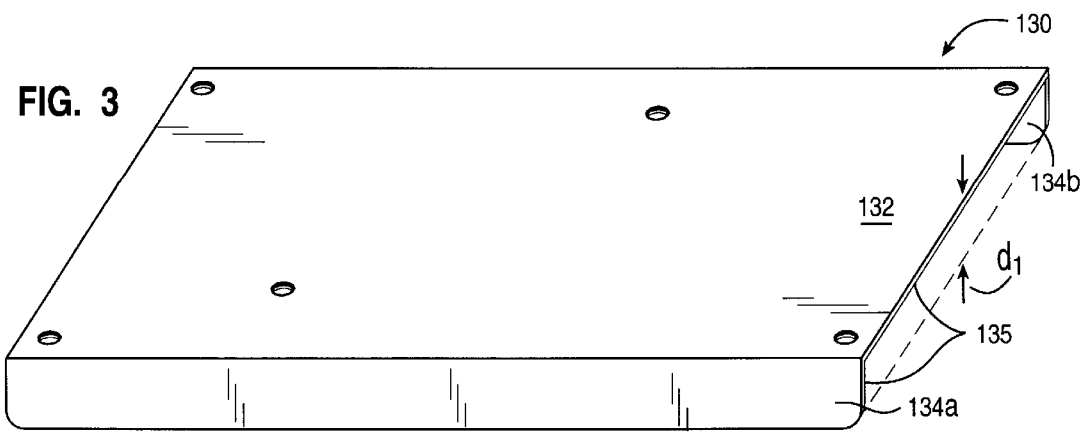
FIG. 3 is a perspective view of an air duct cover according to the present invention including a major panel and first and second side panels extending from the major panel to form a bracket.
Figure 4:
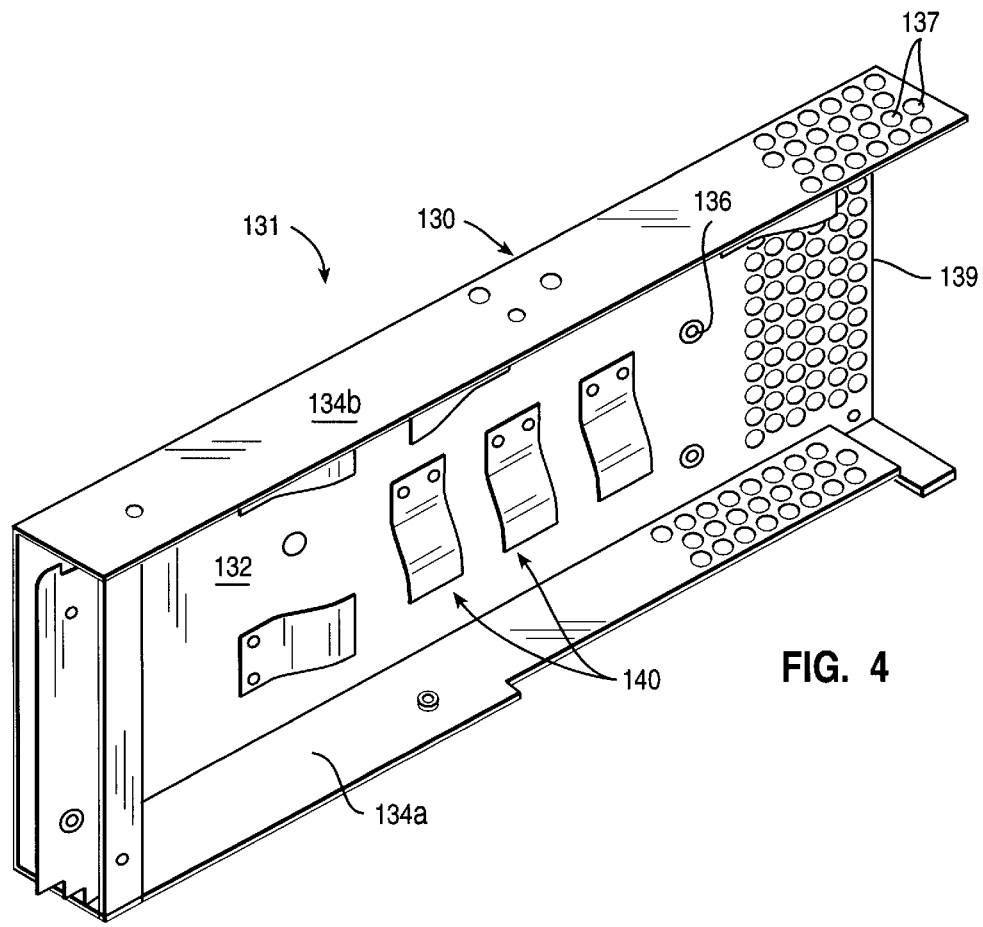
FIG. 4 is a perspective view of one embodiment of an air duct structure according to the present invention including an air duct cover and a spring attached to an interior surface of the air duct cover.
Figure 8:
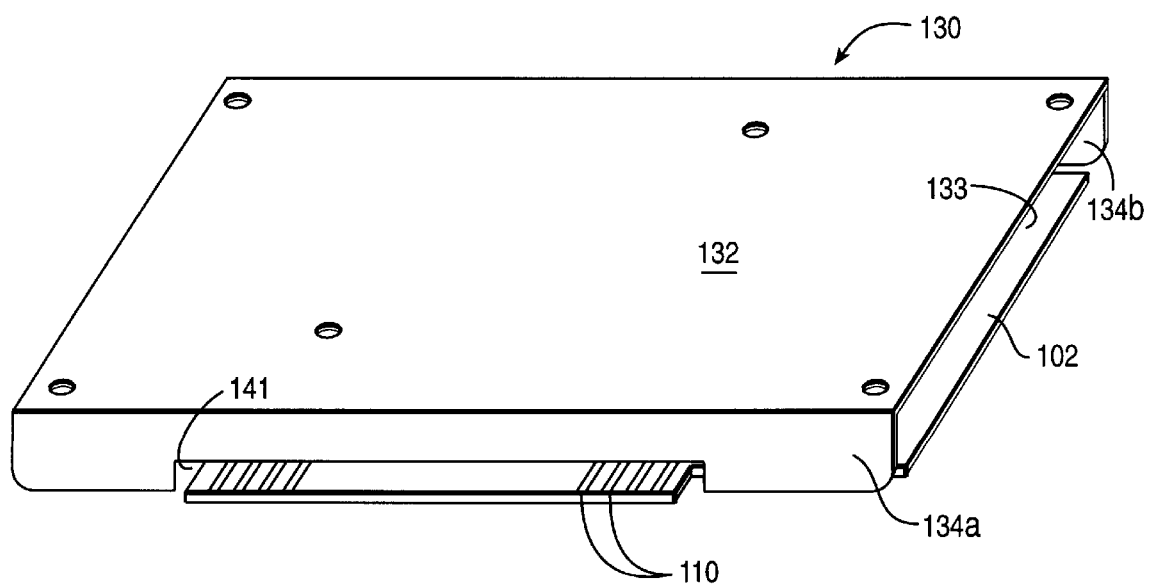
FIG. 8 is a perspective view of a circuit card suitably received by an air duct cover according to the present invention wherein the circuit card and air duct cover define an air duct.

Turning now to FIG. 4, one presently preferred embodiment of an air duct structure 131 for use in cooling a circuit card according to the present invention is depicted. Air duct structure 131 includes an air duct cover 130 and at least one spring 140 affixed to an interior surface of major panel 132 of air duct cover 130. As shown in greater detail in FIG. 3, air duct cover 130 includes a major panel 132 that is preferably rectangular in shape and of a dimension suitable for substantially covering printed circuit board 104. Air duct cover 130 further includes first and second side panels 134a and 134b respectively (collectively referred to as side panels 134). Side panels 134 extend substantially perpendicularly from opposing ends of major panel 132 to form a bracket 135. The depth $d_1$ of bracket 135 is dimensioned for suitably receiving circuit card 102 and a heatsink 170 positioned in close contact with integrated circuit 106. In the preferred embodiment air duct cover 130 preferably comprises an inexpensive and thermally conductive material such as aluminum. The embodiment of air duct cover 130 shown in FIG. 4 includes a plurality of exhaust holes 137 concentrated at a chassis end 139 of air duct cover 130. Turning momentarily to FIG. 8, when circuit card 102 is suitably received by air duct cover 130, circuit card 102 and air duct cover 130 define an air duct 133 in which the heatsink 170 of FIG. 7 resides when heatsink 170 is positioned in close contact with the integrated circuit 106 of FIG. 2. FIG. 8 further depicts an embodiment of air duct cover 130 including a recess 141 in first side panel 134a. Recess 141 permits contact fingers 110 of circuit card 102 to extend exterior to air duct 133 thereby allowing suitable insertion of circuit card 102 into an appropriate connector with air duct cover 132 in place.

Figure 6:
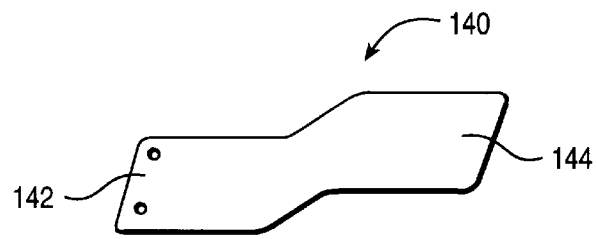
FIG. 6 is a perspective view of one embodiment of a spring for use in the present invention.

FIG. 6 depicts in greater detail a presently preferred embodiment of spring 140, which includes a fixed end 142 and an elevated end 144. Elevated end 144 of spring 140 is displaced with respect to fixed end 142 such that elevated end 144 is displaced from major panel 132 when fixed end 142 is attached to major panel 132. A material suitable for use as spring 140 and possessing the necessary rigidity and flexibility to function as an efficient spring includes stainless steel. In the embodiment shown in FIG. 6, fixed end 142 of spring 140 includes one or more holes for securing fixed end 142 to major panel 132. As will be appreciated, elevated end 144 of spring 140 will have a tendency to force an object with which it is in contact away from major panel 132 when fixed end 142 is attached to major panel 132. When elevated end 144 is in contact with heatsink 170, which, in turn, is in contact with integrated circuit 106, it will be appreciated that spring 140 serves to prevent vertical movement of heatsink 170 relative to integrated circuit 106 thereby retaining heatsink 170 in close contact with integrated circuit 106. Other embodiments might include coil type springs or the like as a suitable substitute for the spring 140 depicted in FIG. 6. Fixed end 142 of spring 140 is attached to major panel 132 and positioned in alignment with a position of integrated circuit 106 within printed circuit board 104 such that elevated end 144 will contact heatsink 170 when heatsink 170 is in close contact with integrated circuit 106 and circuit card 102 is received by air duct cover 132.

Figure 2:
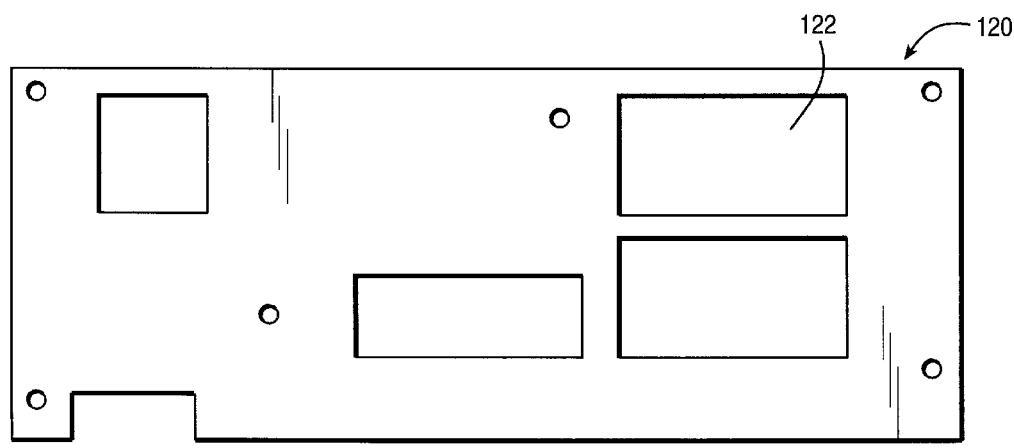
FIG. 2 is a top plan view of a template including a template aperture according to the present invention.

In one embodiment of the present invention, air duct structure 131 further includes a template 120 as shown in FIG. 2. Template 120 is preferably of a rectangular shape sized similarly to major panel 132 such that template 120 may be suitably received within air duct cover 130. Template 120 includes at least one template aperture 122 positioned within template 120 to be aligned with a position of heatsink 170 when heatsink 170 is in close contact with integrated circuit 106. In the preferred embodiment, template 120 comprises a thermally conductive material such as aluminum. When attached suitably to air duct cover 130, aperture 122 is suitable for circumscribing heatsink 170 thereby preventing heatsink 170 from lateral movement with respect to integrated circuit 106. By incorporating a plurality of apertures 122, the present invention contemplates the elimination of heatsink retaining screws or other similar hardware. It will be appreciated that, using the template structure for restraining lateral movement of heatsinks 170, the number of retaining screw or fastening holes that must be formed in printed circuit board 102 is independent of the number of heat sinks 170. The combination of the spring structure 140 discussed previously for preventing vertical movement of heatsink 170 and template 120 for preventing lateral movement of heatsink 170 facilitates maximum packing density of integrated circuits 106 on circuit board 102 without comprising reliability by providing a complete structure for maintaining heatsink 170 in close and secure contact with integrated circuit 106 without incorporating unnecessary fastening hardware or consuming valuable printed circuit board real estate.

Figure 9:
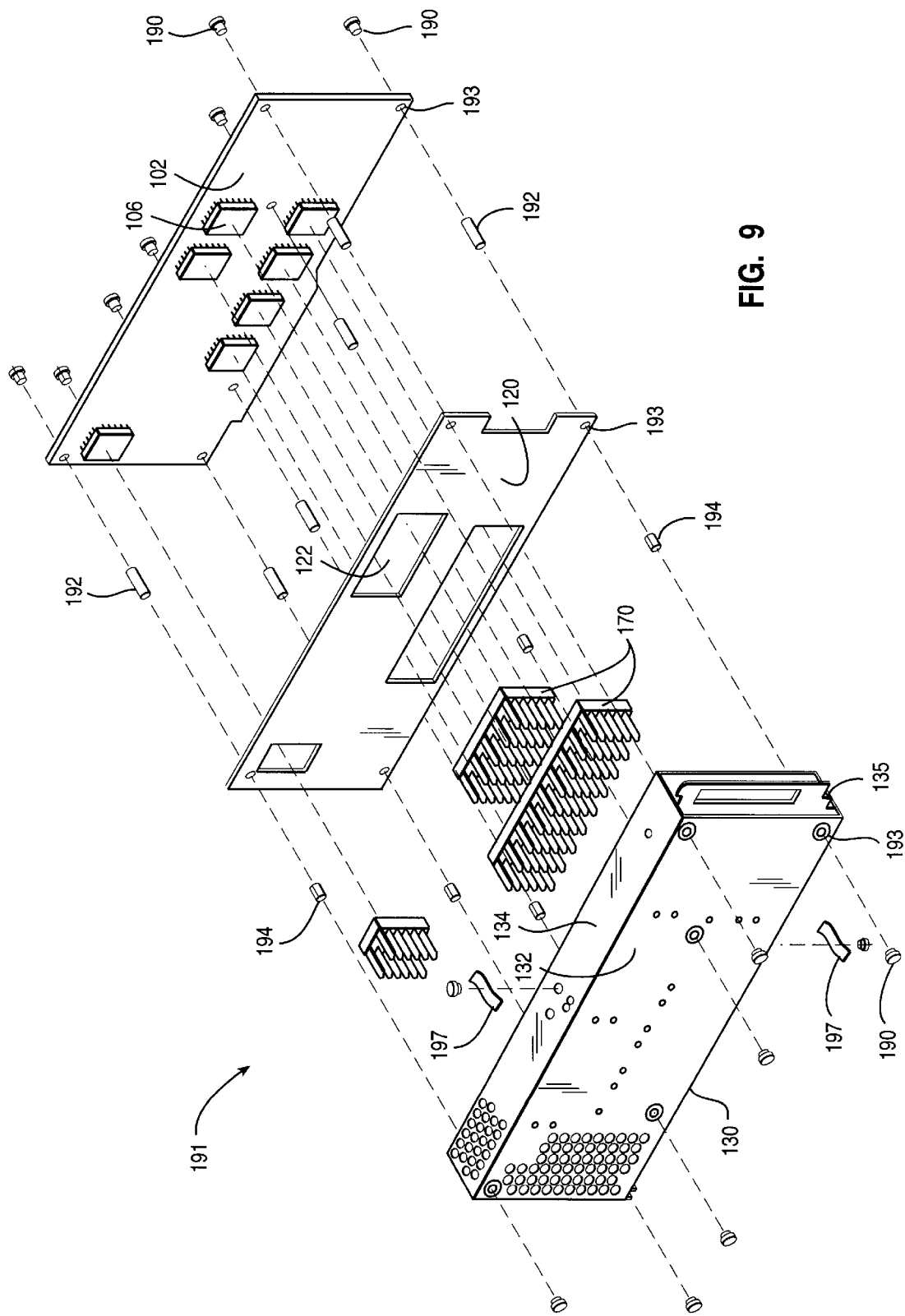
FIG. 9 is an exploded assembly view of one embodiment of a heat dissipation assembly according to the present invention.

Turning to FIG. 9, an exploded assembly view is of a heat dissipation assembly 191 according to the present invention is presented. Heat dissipation assembly 191 includes air duct cover 130 as described above, a spring 140 (not shown in FIG. 9) attached to an interior surface of major panel 132 of air duct 130, and template 120. As discussed previously, template 120 is dimensioned for being received within bracket 135 defined by major panel 132 and side panels 134 of air duct cover 130. In one presently preferred embodiment template 120 and major panel 132 of air duct cover 130 include fastening holes 193 that are aligned with respect to one another such that appropriate fastening means can be utilized to secure air duct cover 130 to template 120. In the preferred embodiment, standard screws 190 and spacer structures 194 are incorporated such that template 120 is attached substantially parallel and displaced from major panel 132. Preferably, circuit card 102 also includes fastening holes 193 aligned to corresponding fastening holes 193 within template 120. Using these fastening holes and a second set of spacer structures 192, circuit card 102 may be attached to air duct cover 130 via an intermediate attachment to template 120 wherein printed circuit board 104 of circuit card 102 is substantially parallel to and displaced from template 120. The sizing of the spacer structures 194 and 192 is determined such that, when fully assembled, printed circuit board 102 defines air duct 133 with air duct cover 132 as shown in FIG. 8. In an embodiment of the present invention in which template 120 is not utilized, circuit card 102 may be attached directly to air duct cover 130 in a similar manner using a single set of spacer structures. One or more retaining clips 197 may also be incorporated to secure air duct cover 130 to circuit card 120 in the event that the force generated by the compressed springs 140 results in bowing of air duct cover 130 or printed circuit board 104.

Figure 10:
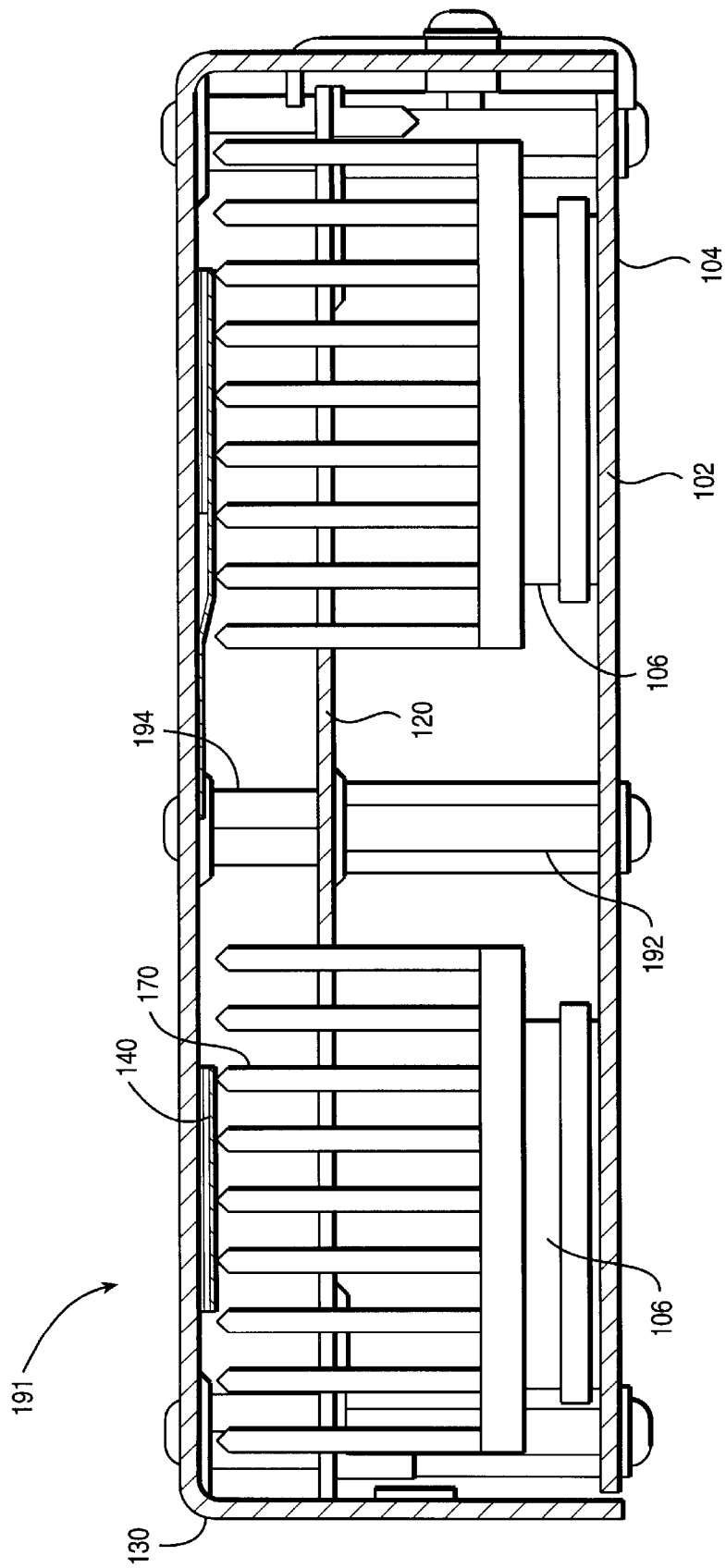
FIG. 10 is a cross sectional view of one embodiment of a heat dissipation assembly according to the present invention.

Turning now to FIG. 10, a cross section view of the fully assembled heat dissipation assembly 191 and the circuit card 102 is shown. When assembled, each heatsink 170 is in close contact with an integrated circuit 106 and held firmly in place by the compressed spring 140 attached to air duct cover 130. Spacer structures 192 and 194 maintain the relative positions of air duct cover 130, template 120, and circuit card 102, and separate circuit card 102 from major panel 132 by a distance such that air duct cover 130 and printed circuit board 104 define an air duct 133 (as shown in FIG. 8) in which heat sink 170 resides. Air duct 133 facilitates heat dissipation by channeling the prevailing air stream through each heatsink 170 providing an effectively higher volume of air flow and increasing the thermal dissipation capability of each heatsink without altering the size or characteristics of the heatsink. In addition, the mechanical support air duct cover 130 provides to circuit card 102 serves a valuable stiffening function that prevents significant bending or bowing of circuit card 102 when circuit card 102 is in close contact with heatsink 170. Any significant bending of bowing of circuit card 102 could result in unreliable connections between contact fingers 110 and a suitable connector thereby reducing overall system reliability. Accordingly, it is believed that the mechanical support air duct cover 130 lends to circuit card 102 could improve system reliability.

Figure 5:
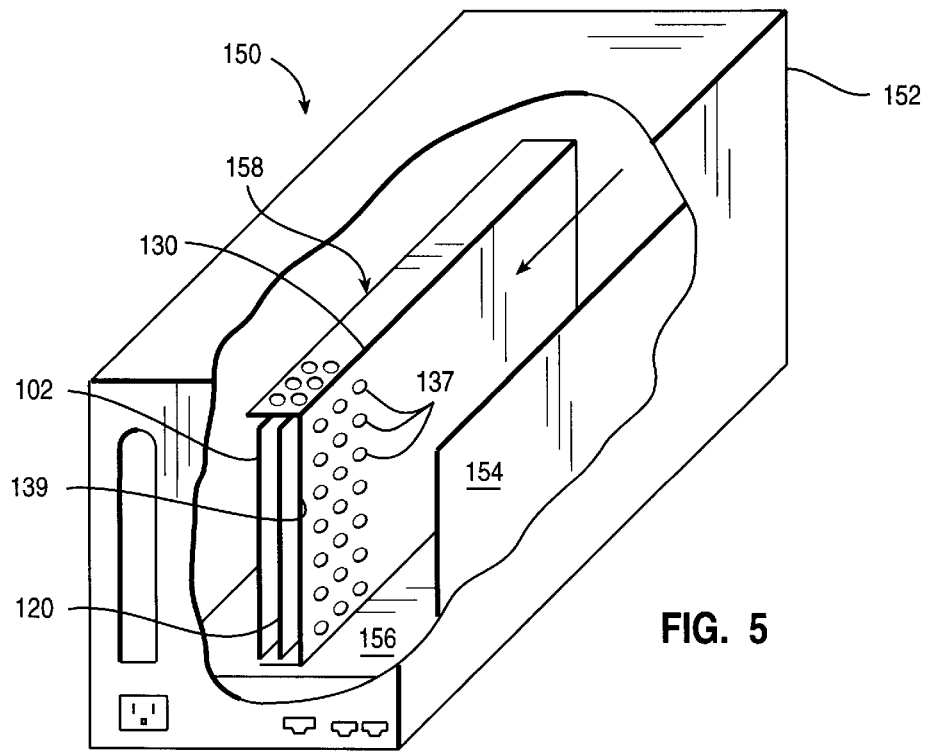
FIG. 5 is a cut away view of a computer assembly according to the present invention including a chassis, a mother board, an expansion board, and an expansion card.

Referring now to FIG. 5, a cut away view of one embodiment of the present invention is shown. In this embodiment, the present invention contemplates a computer assembly 150. Computer assembly 150 includes a chassis 152 to which a mother board 154 is secured. Mother board 154 typically includes a processing unit of computer assembly 150 such as an x86 family or other suitable microprocessor and further includes a bus connector (not shown) for interfacing to a peripheral bus. A bus board 156 is received within the bus connector of mother board 154. Bus board 156 includes at least one expansion card connector. Computer assembly 150 further includes an expansion card 158 received within the expansion card connector of bus board 156. In one embodiment, bus board 156, and expansion card 158 are compliant with an industry standard peripheral bus architecture such as the PCI standard. Expansion card 158 is comprised of circuit card 102, template 120, and air duct cover 130 all as discussed previously. In the embodiment shown in FIG. 5, air duct cover 130 includes a plurality of exhaust holes 137 concentrated at a chassis end 139 of air duct cover 130. As it name implies, chassis end 139 resides proximal to chassis 152 of computer assembly 150. In an embodiment not specifically depicted in FIG. 5, a brace may be attached to air duct cover 130 for attaching air duct cover 130 directly to chassis 152 to reduce the probability of expansion card 158 becoming disconnected from bus board 156 during shipping or subsequent handling. Typically, circuit card 102 will include its own brace that is attached to chassis 152, but the larger sizes of recently introduced expansion cards justify an additional brace attached directly to air duct cover 130. The arrow indicates the direction of air flow within chassis 152 in the preferred embodiment. Typically, the air flow is generated by one or more electric fans (not shown) mounted within assembly 150. Incorporating the heat dissipation assembly and air duct cover structure into computer assembly 150 permits improved heat dissipation of high power computing applications without significantly increasing the complexity or cost of the design. In addition, the presence of the conductive metal shield provided by air duct cover 130 increases reliability of the system by reducing undesirable cross talk between expansion card 138 and neighboring components within assembly 150. More specifically, it will be appreciated by those skilled in the field of electronics and electromagnetic radiation that electrical signals generated by expansion card 158 can induce unwanted electric signals in neighboring circuits and, conversely, electrical signals generated by neighboring circuits can induce unwanted signals in expansion card 158. This cross talk increases as the physical spacing between neighboring components decreases and the operating frequency of the components increases. In the typical environment in which air duct cover 130 is likely to be encountered, namely, an environment including numerous tightly spaced, high performance integrated circuits, the electromagnetic shielding provided by air duct cover 130 is highly desirable.

It will be apparent to those skilled in the art having the benefit of this disclosure that the present invention contemplates an improved mechanism and assembly for dissipating heat generated by an integrated circuit. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A heat dissipation assembly comprising:

an air duct cover including a major panel, first and second side panels, and a spring, wherein said major panel is dimensioned to substantially cover a printed circuit card, said circuit card comprising an integrated circuit affixed to a printed circuit board, and wherein said first and second side panels extend approximately perpendicularly from opposing ends of said major panel to form a bracket, wherein a depth of said bracket is suitable for receiving said circuit card and a heat sink positioned in close contact with said integrated circuit, and further wherein said spring is affixed to an interior surface of said major panel and positioned wherein said spring is suitable for retaining said heat sink in said close contact with said integrated circuit; and a template dimensioned for being received within said bracket and wherein said template is attached to said major panel with spacer structures such that said template is substantially parallel to and displaced from said major panel, and further wherein said template includes a template aperture dimensioned and positioned within said template to circumscribe said heat sink.

2. The assembly of claim 1, wherein said air duct cover includes a plurality of exhaust holes concentrated at a chassis end of said air duct cover.

3. The assembly of claim 1, wherein said air duct cover and said template comprise aluminum.

4. The assembly of claim 1, wherein said first side panel of said air duct cover includes a recess suitable for permitting contact fingers of said printed circuit board to extend exterior to said air duct when said printed circuit board is received within said air duct cover.

5. The assembly of claim 1, wherein said spring comprises stainless steel.

6. A computer assembly comprising:

a chassis;

a mother board situated within said chassis, said mother board including a processor and a bus connector;

a bus board received within said bus connector, wherein said bus board includes an expansion card connector suitable for receiving an expansion card; and an expansion card received within said expansion card connector, said expansion card including:

a printed circuit board to which an integrated circuit is attached, said printed circuit board being received within said expansion card connector of said bus board;

a heat sink in close contact with said integrated circuit;

an air duct cover attached to said printed circuit board wherein said air duct cover and said printed circuit board cooperatively define an air duct in which said heat sink resides; and a spring affixed to an interior surface of said air duct cover and positioned wherein said spring contacts said heat sink and retains said heat sink in said close contact with said integrated circuit.

7. The computer assembly of claim 6, further comprising a template attached between said air duct cover and said printed circuit board, wherein an aperture of said template circumscribes said heat sink and prevents said heat sink from lateral movement with respect to said integrated circuit.

8. The computer assembly of claim 6, wherein said air duct cover and said template are comprised of aluminum.

9. The computer assembly of claim 6, further comprising a brace attached between said air duct cover and said chassis for securing said air duct cover directly to said chassis.

10. The computer assembly of claim 6, wherein said air duct cover includes a plurality of exhaust holes concentrated at a chassis end of said air duct cover, and further wherein said chassis end of said air duct cover is proximal to said chassis of said computer assembly.

11. An air duct structure for use in cooling a circuit card, said structure comprising an air duct cover including a major panel and first and second side panels extending substantially perpendicularly from opposing ends of said major panel to form a bracket, and wherein said major panel is dimensioned to substantially cover said circuit card, said circuit card comprising a printed circuit board to which an integrated circuit is connected, and wherein a depth of said bracket is suitable for receiving said circuit card and a heat sink positioned in close contact with said integrated circuit, and wherein an air duct, within which said heat sink resides, is defined by said air duct cover and said printed circuit board when said circuit card and said heat sink are suitably received by said air duct cover, and further wherein a spring is affixed to an interior surface of said major panel and positioned wherein said spring is suitable for contacting said heat sink and retaining said heat sink in said close contact with said integrated circuit when said heat sink and said circuit card are suitably received by said air duct cover.

12. The structure of claim 11, wherein said air duct cover includes a plurality of exhaust holes concentrated at a chassis end of said air duct cover.

13. The structure of claim 11, wherein said air duct cover comprises a thermally conductive material.

14. The structure of claim 13, wherein said thermally conductive material comprises aluminum.

15. The structure of claim 11, wherein said first side panel includes a recess suitable for permitting contact fingers of said circuit card to extend exterior to said air duct when said circuit card is received within said air duct cover.

16. The structure of claim 11, wherein said air duct cover includes a fastener hole suitable for receiving a fastener, and further wherein said fastener hole in said air duct cover is positioned with respect to a fastener hole in said circuit card wherein said circuit card fastener hole and said air duct cover fastener hole are aligned when said circuit card is appropriately received by said air duct cover.

17. The structure of claim 11, wherein said spring comprises a fixed end attached to said major panel and an elevated end, wherein said elevated end is displaced from said major panel when said fixed end is attached to said major panel.

18. The structure of claim 17, wherein said spring is comprised of stainless steel.

19. The structure of claim 11, further comprising a template attached to said major panel of said air duct cover by spacer structures wherein said template is parallel to and displaced between said major panel and said printed circuit board and further wherein said template includes an aperture sized and positioned to receive said heat sink when said heat sink is in said close contact with said integrated circuit to prevent lateral motion of said heat sink with respect to said integrated circuit.

\* \* \* \* \*